No. 859,144. PATENTED JULY 2, 1907.
W. STANLEY.
WEEDLESS FISH HOOK.
APPLICATION FILED MAY 7, 1907.
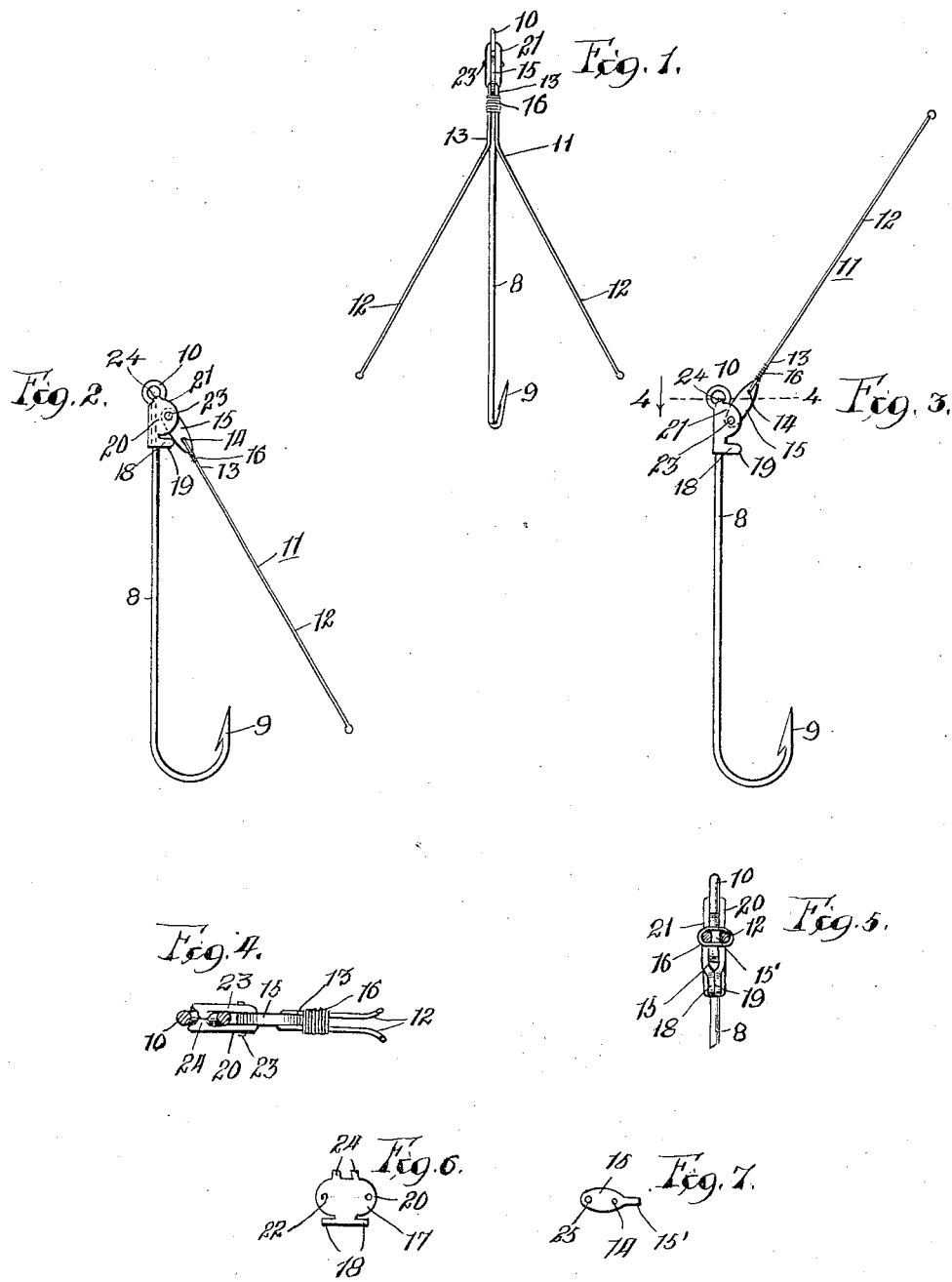

UNITED STATES PATENT OFFICE.

WILLIAM STANLEY, OF CHICAGO, ILLINOIS.

WEEDLESS FISH-HOOK.

No. 859,144.            Specification of Letters Patent.            Patented July 2, 1907.

Application filed May 7, 1907. Serial No. 372,297.

*To all whom it may concern:*

Be it known that I, WILLIAM STANLEY, a citizen of the United States, residing at Chicago, in the county of Cook and State of Illinois, have invented certain new and useful Improvements in Weedless Fish-Hooks, of which the following is a specification.

The object of this invention is to provide a guard for the hook point, which is secured to the hook shank in such a manner as to movably adapt itself to the varying conditions of use. The guard is so positioned and secured that it will leave the point or barb unobstructed for the strike of the fish and at the same time fully protect and guard the point against the entanglement of weeds.

The invention consists in the features of construction and combination of parts hereinafter described and claimed.

In the drawings, Figure 1 is an elevation of the device of the present invention, with the hook facing in; Fig. 2 a side elevation showing the guard lowered; Fig. 3 an elevation showing the guard raised; Fig. 4 an enlarged sectional view taken on line 4—4 of Fig. 3, looking in the direction of the arrow; Fig. 5 an inner side elevation of the upper portion of the hook with the prongs of the guard broken away; Fig. 6 a view of the blank for forming the pivot ears; and Fig. 7 a detail of the pivot member.

The weedless fish hook comprises a hook of the usual formation, having a shank 8 terminating in a barb 9 at one end, and in an eye 10 at the opposite end thereof. The guard 11, in this instance, is of V-shaped formation, as shown, and comprises diverging prongs 12, which are preferably formed from a single piece of wire consisting of a neck portion 13 passed through an eye 14 in a pivotal member 15, having a substantially elongated oval formation. A finger 15′ is formed on the outer end of a pivotal member 15, and lies between the sections of the neck portion of the guard, which are secured thereto by suitable binding means 16, such as wire, which provides a firm and rigid attachment for the guard.

A blank 17, as shown in Fig. 6, is utilized for forming connection between the guard and the shank of the fish hook. This is made of metal and consists of a pair of fingers 18 at its lower end, which, when wrapped about the hook shank and soldered thereon or otherwise secured thereto, form, in effect, a stop 19 for limiting the downward movement of the guard. The body of this blank consists of a pair of ears 20, which, when positioned about the shank, form a pivotal mounting 21, in which the eyes 22 serve as suitable mountings for a pin or pivot 23. A pair of tongues 24 upon the upper part of the blank are turned or bent over so as to lie within the eye at the upper end of the hook shank, the eye affording a stop for limiting the upward movement of the guard, as shown in Fig. 3.

The pivotal member 15, as illustrated in Fig. 7, has two eyes 14 and 25, respectively, near either end thereof, as well as the finger 15′. When the guard 11 is secured to the pivotal member, the inner end of the prongs thereof will lie in close proximity to the finger 15′, and the guard is thus fastened to the pivotal member by holding the same in close contact against the finger by the use of a suitable binding agent, such as wire.

When it is desired to secure the guard to the shank of the hook, the blank is suitably positioned at the upper end of the shank and adjacent to the eye of the same. The binding arms 18, on the lower part of the blank, are then bent around the shank and suitably secured, as by soldering or otherwise. The body of the blank is likewise bent around the shank so that its ears will, in effect, form a pivotal portion adapted for receiving the pivotal member, said member being secured therein by means of a pivot 23 inserted therethrough and fastened therein. The tongues 24 on the upper part of the blank, as before described, are bent over so as to lie within the eye 10 at the end of the shank. The peculiar formation of the pivotal member affords a ready and easy means for uniting the guard with the hook shank. The prongs of the guard being preferably made of wire, the same is inserted through the eye 14 near one end of the pivotal member, and afterwards given its proper formation. The finger-like portion of this pivotal member affords an easy and ready means for securely attaching the various parts of the guard together so that all of its members may be secured rigidly together at one place.

The arrangement is one which permits a free fore and aft movement of the guard prongs from the position shown in Fig. 2 to that shown in Fig. 3. As the guard of the present invention is constructed, it will be impossible for the prongs to become entangled with weeds after the fish has been hooked, which, of course, would not only tend to injure the prongs but permit the escape of the fish. The prongs are sufficiently elevated and divergent to provide an unobstructed hook for the strike of the fish, which is highly superior to an arrangement in which the guard is in contact with or closely adjacent to the point of the hook. The hook, being formed of much heavier material than the guard, and carrying the bait, will normally ride beneath the guard with the point and barb of the hook extending upwardly in position to receive the strike of the fish.

What I claim as new and desire to secure by Letters Patent is:

1. A weedless fish hook comprising a hooked shank, ears secured to the shank and forming a pivotal mounting, and a guard pivoted between the ears and adapted to swing through the arc of a circle, substantially as described.

2. A weedless fish hook comprising a hooked shank, ears secured to the shank and forming a pivotal mounting, a guard pivoted between the ears and adapted to swing through the arc of a circle, means for limiting the movement of the guard in an upward direction, and means for limiting the movement of the guard downwardly substantially as described.

3. A weedless fish hook comprising a hooked shank, ears secured to the shank near the end thereof, a guard comprising divergent prongs, a pivotal member to which the prongs are secured, said member being pivoted between the ears, substantially as described.

4. A weedless fish hook comprising a hooked shank, ears secured to the shank near the end thereof, a guard comprising divergent prongs, a pivotal member to which the prongs are secured, said member being pivoted between the ears, means for regulating the movement of the guard in an upward direction, and means for regulating the movement of the guard downwardly substantially as described.

5. A weedless fish hook comprising a shank having a hook at one end and an eye at the other, a pivotal mounting at the eye end of the shank in the form of a pair of connected ears bent around the shank, a guard comprising divergent prongs, and a pivotal member to which the prongs are connected, said member being pivoted between the ears, substantially as described.

6. A weedless fish hook comprising a shank having a hook at one end and an eye at the other, a pivotal mounting comprising connected ears and connected fingers, the ears being bent around the shank to provide a pivotal attachment, and the fingers being bent around to form a stop, and a guard terminating in a pivotal member pivoted between the ears substantially as described.

WILLIAM STANLEY.

Witnesses:
 WALKER BANNING,
 PIERSON W. BANNING.